United States Patent
Ren et al.

(10) Patent No.: US 12,468,266 B1
(45) Date of Patent: Nov. 11, 2025

(54) DUAL FREQUENCY LASER FOR DUAL MODE OPTICAL LATTICE ATOMIC CLOCK

(71) Applicants: NATIONAL TIME SERVICE CENTER, CHINESE ACADEMY OF SCIENCES, Shaanxi (CN); HEFEI NATIONAL LABORATORY, Anhui (CN)

(72) Inventors: Jie Ren, Xi'an (CN); Hong Chang, Xi'an (CN)

(73) Assignees: NATIONAL TIME SERVICE CENTER, CHINESE ACADEMY OF SCIENCES, Xi'an (CN); HEFEI NATIONAL LABORATORY, Hefei (CN)

( * ) Notice: Subject to any disclaimer, the term of this patent is extended or adjusted under 35 U.S.C. 154(b) by 0 days.

(21) Appl. No.: 19/243,685

(22) Filed: Jun. 19, 2025

(30) Foreign Application Priority Data

Sep. 12, 2024 (CN) .......................... 202411274715.6

(51) Int. Cl.
| G04F 5/14 | (2006.01) |
| H01S 3/094 | (2006.01) |
| H01S 3/137 | (2006.01) |

(52) U.S. Cl.
CPC .......... G04F 5/14 (2013.01); H01S 3/094069 (2013.01); H01S 3/137 (2013.01)

(58) Field of Classification Search
CPC ........................................................ G04F 5/14

(Continued)

(56) References Cited

U.S. PATENT DOCUMENTS

| 5,473,626 A | 12/1995 | Fan et al. |
| 5,778,016 A * | 7/1998 | Sucha ..................... G01S 17/18 |
| | | 372/38.1 |

(Continued)

FOREIGN PATENT DOCUMENTS

| CN | 101388521 A | 3/2009 |
| CN | 102916335 A | 2/2013 |

(Continued)

OTHER PUBLICATIONS

First Office Action in Chinese Application No. 202411274715.6 mailed on Dec. 11, 2024, 16 pages.

(Continued)

*Primary Examiner* — Joseph Chang
(74) *Attorney, Agent, or Firm* — PORUS IP LLC

(57) ABSTRACT

A dual frequency laser for a dual mode optical lattice atomic clock is provided, which includes a 532 nm pump laser source, a beam splitter set, a dichroic mirror, a titanium sapphire crystal, a birefringent crystal, an electro-optic crystal, a concave reflector and a PZT. The dichroic mirror and the concave reflector form a first resonant cavity configured to generate a laser; the beam splitter set is configured to split a collimated pump beam into two spatially separated pump beams; an optical axis of the birefringent crystal generates propagation paths for ordinary ray and extraordinary ray within the same cavity to form two eigen modes; the electro-optic crystal is configured to add an electric field externally in a direction parallel to an electric vector of the ordinary ray or the extraordinary ray; and the PZT is combined with the electro-optic crystal to regulate two laser frequencies simultaneously.

6 Claims, 4 Drawing Sheets

(58) Field of Classification Search
USPC .......................................................... 331/3
See application file for complete search history.

(56) References Cited

U.S. PATENT DOCUMENTS

| | | | |
|---|---|---|---|
| 6,028,869 A | | 2/2000 | Harada et al. |
| 6,724,787 B2* | | 4/2004 | Masterson ............ H01S 3/0627 372/27 |
| 2006/0209912 A1 | | 9/2006 | Luo et al. |
| 2006/0274808 A1 | | 12/2006 | Luo et al. |

FOREIGN PATENT DOCUMENTS

| | | |
|---|---|---|
| CN | 103117506 A | 5/2013 |
| CN | 103872572 A | 6/2014 |
| CN | 104242044 A | 12/2014 |
| CN | 112290359 A | 1/2021 |
| CN | 112290381 A | 1/2021 |
| CN | 113937610 A | 1/2022 |
| CN | 114122888 A | 3/2022 |
| JP | 2002148472 A | 5/2002 |
| WO | 0194992 A1 | 12/2001 |

OTHER PUBLICATIONS

Notification to Grant Patent Right for Invention in Chinese Application No. 202411274715.6 mailed on Jan. 3, 2025 5 pages.
Huang, Chunning et al., Several Kinds of novel dual-frequency ND: YAG Lasers pumped by Ld, Optical Technique, 4 pages, 2002.
Du, Hanxiao et al., Research Status and Progress of Dual Frequency, Tool Engineering, 56(3): 3-8, 2022.
Ding, Xin et al., An all-solid-state high power quasi-continuous-wave tunable dual-wavelength Ti:sapphire laser system using birefringence filter, Chinese Physics, 16(7): 1991-1995, 2007.

* cited by examiner

DUAL FREQUENCY LASER FOR DUAL MODE OPTICAL LATTICE ATOMIC CLOCK

CROSS-REFERENCE TO RELATED APPLICATIONS

This application claims priority to Chinese Patent Application No. 202411274715.6, filed on Sep. 12, 2024, the entire contents of which are incorporated herein by reference.

TECHNICAL FIELD

The present disclosure relates to the field of optical atomic clocks, and in particular relates to a dual frequency laser for a dual mode optical lattice atomic clock.

BACKGROUND

An optical lattice atomic clock is a high-precision atomic clock with high frequency stability and low measurement uncertainty, which plays a key role in a plurality of important scientific and technological fields, such as a high-precision timekeeping, a geodesic measurement, and a basic physics test, etc.

SUMMARY

One of the embodiments of the present disclosure provide a dual frequency laser for dual mode optical lattice atomic clock. The dual frequency laser includes a 532 nm pump laser, and in an emission optical path of the 532 nm pump laser, a beam splitter set, a dichroic mirror, a titanium sapphire crystal, a birefringent crystal, an electro-optic crystal, a concave reflector and piezoelectric ceramics (PZT) are disposed sequentially. The dichroic mirror and the concave reflector form a first resonant cavity configured to generate a laser; the beam splitter set is configured to split a collimated pump beam into two pump beams that are spatially separated; an optical axis of the birefringent crystal is at an angle of 45° to a light incidence plane to generate propagation paths for ordinary ray and extraordinary ray within the same cavity to form two eigen modes; in each of the propagation paths for the ordinary ray and the extraordinary ray, a set of birefringent filter and etalon is provided, an anti-reflective coating of the birefringent filter and a high-reflective coating of the concave reflector have spectral bands with overlapping edges, the spectral bands being used for a rough selection of a laser wavelength, and the etalon and the birefringent filter being used for a mode fine selection; the electro-optic crystal is configured to add an electric field externally in a direction parallel to an electric vector of the ordinary ray or an electric vector of the extraordinary ray to independently regulate a frequency of one polarized ray; and the piezoelectric ceramic is combined with the electro-optic crystal to regulate two laser frequencies simultaneously.

In some embodiments, the beam splitter set includes two focusing lenses and a wedge prism, the wedge prism being inserted into a pump laser path to generate the two pump beams sharing a same lens imaging system by refracting half of a cross section area of the collimated pump beam.

In some embodiments, by coating the overlapping edges of the spectral bands on an optical interface in a cavity to perform the rough selection and filtration on a vibration mode in the cavity, and to use the set of birefringent filter and etalon to perform the mode fine selection, the first resonant cavity outputs dual frequency lasers with a specific wavelength. A spectral band edge of the anti-reflective coating of each of the two birefringent filters respectively overlaps with a spectral band edge of the high-reflective coating of the concave reflector, to respectively realizes a single frequency operation of a specific wavelength in a polarization direction.

In some embodiments, the two birefringent filters are a first birefringent filter and a second birefringent filter; the first birefringent filter is coated with the anti-reflective coating with a wavelength coverage of 600 nm-770 nm, the second birefringent filter is coated with the anti-reflective coating with a wavelength coverage of 800 nm-1000 nm, and the concave reflector is coated with the high-reflective coating with a wavelength coverage of 740 nm-830 nm; and the laser frequency is finely regulated by a voltage of the piezoelectric ceramic and the electro-optic crystal, so that the first resonant cavity outputs the dual frequency lasers of 759 nm and 813 nm.

In some embodiments, the dual frequency laser further includes a second resonance cavity. The second resonance cavity contains the same optical elements as the first resonant cavity, and the second resonance cavity shares the 532 nm pump laser with the second resonant cavity. A third birefringent filter in the second resonant cavity is coated with the anti-reflective coating with a wavelength coverage of 600 nm-810 nm, a fourth birefringent filter is coated with the anti-reflective coating with a wavelength coverage of 910 nm-1,000 nm, and the concave reflector is coated with the high-reflective coating with a wavelength coverage of 790 nm-930 nm; by regulating two birefringent filters and two etalons in the second resonant cavity for the mode fine selection, the second resonant cavity outputs the dual frequency lasers of 798 nm and 922 nm.

In some embodiments, by regulating an insertion depth of the wedge prism in the emission optical path, a power ratio between two pump beams separated in each resonant cavity and a power ratio between the corresponding output dual frequency lasers are regulated.

BRIEF DESCRIPTION OF THE DRAWINGS

The present disclosure is further illustrated in terms of exemplary embodiments. These exemplary embodiments are described in detail with reference to the drawings. These embodiments are not limiting, and in these embodiments, the same numbering denotes the same structure, wherein.

Figure 1:
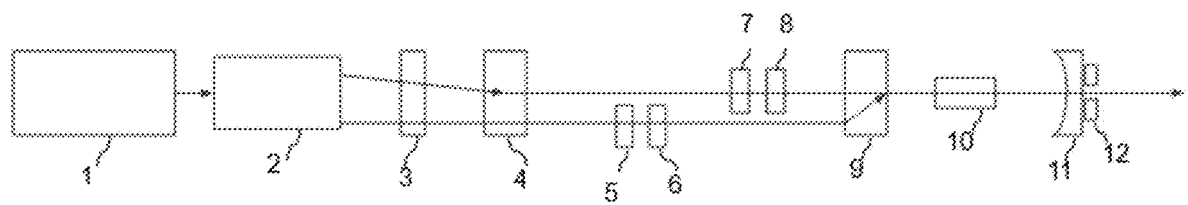
FIG. 1 is a schematic diagram illustrating an exemplary dual frequency laser for a dual mode optical lattice atomic clock according to some embodiments of the present disclosure.

Labels: 100-dual frequency laser; 1-532 nm pump laser; 2-beam splitter set; 3-dichroic mirror; 4-titanium sapphire crystal; 5-first birefringent filter; 6-first etalon; 7-second birefringent filter; 8-second etalon; 9-birefringent crystal; 10-electro-optic crystal; 11-concave reflector; 12-piezoelectric ceramic (PZT); 13-beam splitter set; 14-dichroic mirror;

15-titanium sapphire crystal; 16-third birefringent filter; 17-third etalon; 18-fourth birefringent filter; 19-fourth etalon; 20-birefringent crystal; 21-electro-optic crystal; 22-concave reflector; 23-piezoelectric ceramic; 201-first focusing lens; 202-second focusing lens; 203-wedge prism; 300-dual frequency laser.

DETAILED DESCRIPTION

To more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those skilled in the art to apply the present disclosure to other similar scenarios based on the accompanying drawings without creative labor. Unless obviously obtained from the context or the context illustrates otherwise, the same numeral in the drawings refers to the same structure or operation.

It should be understood that the terms "system," "device," "unit," and/or "module" as used herein is a method of distinguishing between different components, elements, parts, sections, or assemblies at different levels. However, the words may be replaced by other expressions if other words accomplish the same purpose.

As used in the disclosure and the appended claims, the singular forms "a," "an," and "the" include plural referents unless the content clearly dictates otherwise. In general, the terms "including" and "comprising" suggest only the inclusion of clearly identified operations and elements, which do not constitute an exclusive list, and the method or device may also include other operations or elements.

Flowcharts are used in the present disclosure to illustrate operations performed by a system according to embodiments of the present disclosure. It should be appreciated that the preceding or following operations are not necessarily performed in an exact sequence. Instead, operations may be processed in reverse order or simultaneously. Also, it is possible to add other operations to these processes or remove an operation or operations from these processes.

A dual mode optical lattice atomic clock (referred to as a dual mode optical clock) is a composite optical clock structure based on two atomic systems, which eliminates systematic errors such as a blackbody radiation frequency shift, a direct current (DC) Stark frequency shift, etc., and realizes a self-comparison function of the atomic clock, and eliminates a "dead time" in an operation process through an alternating clock transition detection manner, and thus is one of important development directions for future high-precision atomic clocks.

The dual mode optical clock may be combined using different atoms, and the dual mode optical clocks described in the present disclosure refer to dual mode optical lattice atomic clocks based on Sr atoms and Yb atoms. Within an Sr/Yb dual mode optical clock system, there are single frequency lasers with 11 wavelengths including, but not limited to, 399 nm, 461 nm, 689 nm, 556 nm, 759 nm, 813 nm, 1388 nm, 679 nm, 707 nm, 698 nm, 578 nm, etc. Therefore, how to reduce a complexity of the laser system is an important issue for the system.

Of these, the lasers with wavelength of 759 nm and 813 nm used for optical lattice construction have a high power requirement in an order of watts. The prior art generally employs a regulatable external cavity semiconductor laser with external power amplification or a high power pump titanium sapphire laser, both of which are used to satisfy the above mentioned power requirement. However, the former is noisier, while the latter has a relatively complex structure and is greater and more costly. Therefore, it is necessary to propose a dual frequency laser, which stably outputs dual frequency lasers with multi-wavelength and high-power for dual mode optical lattice atomic clock while reducing a complexity.

FIG. 1 is a schematic diagram illustrating an exemplary dual frequency laser for a dual mode optical lattice atomic clock according to some embodiments of the present disclosure.

In some embodiments, as shown in FIG. 1, the dual frequency laser 100 includes a pump laser (1), and a beam splitter set (2), a dichroic mirror (3), a titanium sapphire crystal (4), two sets of birefringent filter and etalon (i.e., a birefringent filter (5) and a etalon (6) for one set, a birefringent index filter (7) and a etalon (8) for another set), a birefringent crystal (9), an electro-optic crystal (10), a concave reflector (11) and a piezoelectric ceramic (PZT) (12) are sequentially disposed in the emission optical path of the 532 nm pump laser. The dichroic mirror (3) and the concave reflector (11) form a first resonant cavity configured to generate a laser. The beam splitter set (2) is configured to split a collimated pump beam into two spatially separated pump beams. An optical axis of the birefringent crystal (9) is at an angle of 45° to a light incidence plane to generate propagation paths for ordinary ray (O ray) and extraordinary ray (E ray) within the same cavity (i.e., a first resonant cavity) to form two eigen modes. In each of the propagation paths for O ray and E ray, a set of birefringent filter and etalon is provided, an anti-reflective coating of the birefringent filter and a high-reflective coating of the concave reflector (11) have spectral bands with overlapping edges. The spectral bands are used for a rough selection of a laser wavelength, and the etalon and the birefringent filter are used for a mode fine selection. The electro-optic crystal (10) is configured to add an electric field externally in a direction parallel to an electric vector of the O ray or an electric vector of the E ray to independently regulate a frequency of one polarized ray (i.e., one of the polarized rays in the O ray and the E ray); and the piezoelectric ceramic (12) is combined with the electro-optic crystal to regulate two laser frequencies (i.e., the laser frequencies of the O ray and the E ray) simultaneously. In the present disclosure, performing the selection on the laser wavelength (e.g., rough or fine selection) may also be referred to as selecting on a mode or a vibration mode.

The pump laser (1) is used to emit the pump beam. In some embodiments, the pump laser (1) is configured to emit the pump beam with a particular wavelength into a gain medium to provide an excitation energy for the gain medium to realize a particle count inversion to drive a laser oscillation. For example, the pump laser (1) includes a source laser, an arc lamp, a flash lamp, an electrical discharge device, a chemical reaction device, an explosive device, etc. A type and a wavelength of the pump laser (1) may be selected based on an absorption property of the gain medium.

The pump beam refers to a laser beam that is emitted by the pump laser (1) and used to excite the gain medium to achieve the particle count inversion. In some embodiments, the pump laser (1) is a 532 nm laser that outputs the pump beam with a wavelength of 532 nm.

The beam splitter set (2) refers to an assembly used to split the pump beam. In some embodiments, the beam splitter set (2) includes at least one optical lens with a beam splitting function.

In some embodiments, the beam splitter set (2) splits the collimated pump beam into two spatially separated lasers. The two lasers do not overlap with each other in a propagation direction and a spatial path.

The dichroic mirror (3) and the concave reflector (11) form a first resonant cavity configured to generate the dual frequency lasers. The first resonant cavity refers to a cavity structure used to form the laser oscillation. The first resonant cavity may include the dichroic mirror (3) and the concave reflector (11) as two end mirrors. The titanium sapphire crystal (4), two sets of birefringent filters and etalons, the birefringent crystal (9), and the electro-optic crystal (10) are located inside the first resonant cavity.

The dichroic mirror (3) is provided in the pump ray optical path (i.e., the emission optical path of the pump laser) between the beam splitter set (2) and the titanium sapphire crystal (4) to be taken as an input end mirror of the first resonant cavity. The dichroic mirror (3) has a high reflectivity to allow the 532 nm laser to enter the titanium sapphire crystal (4) for excitation; at the same time, the dichroic mirror (3) has a high reflectivity for a stable oscillation of the laser in the first resonant cavity.

The titanium sapphire crystal (4) is used to generate the particle count inversion under an irradiation of the pump laser (1), which is used as the gain medium that absorbs an energy of the pump beam and generates an excited radiation (the laser).

In some embodiments, using the titanium sapphire crystal (4) as the gain medium generates sufficiently high gains at both 759 nm and 813 nm.

The output wavelength and related features of the dual frequency laser are determined by a material property of the gain medium employed. The gain media in different materials have different gain spectral widths, which are expressed as a linear spectrum or a wide spectrum. The gain media with the wide spectra allows the regulating of the laser frequency. A plurality of types of the gain media have been developed and are widely used in different laser structures to meet the requirements for the lasers output at a plurality of wavelengths. Under the excitation of the pump laser (1), the gain media (i.e., the titanium sapphire crystal) may generate the particle count inversion, in the gain media, a spontaneous and stimulated emission of photons occurs, leading to a phenomenon of optical gain or amplification and generating the laser output.

The birefringent crystal (9) is a crystalline material capable of splitting the ray into two beams of polarized ray whose vibration directions are perpendicular to each other using a birefringent effect, and the birefringent crystal is used to achieve a beam separation and a path shunting in the optical path. For example, the birefringent crystal (9) is chosen from yttrium orthovanadate (YVO4).

In some embodiments, the optical axis of the birefringent crystal (9) is at the angle of 45 degrees to the light incidence plane to generate the propagation paths for ordinary ray (O ray) and extraordinary ray (E ray) within the same cavity (the first resonant cavity). The O ray and the E ray may propagate along different propagation paths in the same cavity, forming two eigen modes, respectively.

A beam of monochromatic ray incident at a certain angle to the birefringent crystal, in addition to a special angle, the beam of monochromatic ray is separated into two beams refracted in different directions, which are linear polarized rays whose vibration directions are perpendicular to each other. This is the birefringence phenomenon. These two beams of linear polarized ray with perpendicular polarization directions is the O ray (ordinary ray) and E ray (extraordinary ray). The O ray in the propagation path of the birefringent crystal and the propagation path of the ray in the isotropic medium (such as a glass) are consistent, while the propagation path of the E ray deflects relative to the propagation path of the ray in the isotropic medium due to the birefringence effect. For the birefringent crystal YVO4 whose cutting direction is at a 45° angle to the optical axis, the E ray has a greater refractive angle, and thus the E ray propagates over a greater propagation distance when radiating in a flat plate birefringent crystal at an angle close to a vertical incidence.

The eigen mode refers to a specific form of electromagnetic field distribution where a light field is stabilized in a resonant cavity, and the distribution satisfies a boundary condition of the resonant cavity and a solution of a fluctuation equation. The eigen mode determines an output feature (e.g., a spatial intensity distribution, a frequency, a polarization, etc.) of the laser.

To realize a dual wavelength laser output, the birefringent crystal (9) with an optical axis at an angle of 45° to the light incidence plane is placed inside the first resonant cavity, so that two eigen modes are formed by generating the propagation paths of the O ray and the E ray inside the same cavity (i.e., inside the first resonant cavity). As the E ray has a transverse offset in an optical path portion of the gain crystal relative to the O ray, a certain spatial separation may occur on gains of the two eigen modes, so as to avoid a gain competition between the modes, thus obtaining a stable dual wavelength oscillation. In addition, polarizations of the O ray and the E ray are perpendicular to each other, so the electro-optic crystal (10) may be inserted into the cavity. By adding an electrode field in a direction parallel to an electric vector of the O ray or an electric vector of the E ray, the frequency of one of the polarized rays (i.e., one of the O ray or the E ray) may be independently regulated, and then combining the piezoelectric ceramic (12), the frequencies of the O ray and the E ray may be locked at the same time.

The concave reflector (11) refers to a concave reflection element with a spherical or parabolic surface.

In some embodiments, the beam splitter set (2) includes two focusing lenses and a wedge prism, the wedge prism is inserted into the pump laser path (i.e., the emission optical path of the pump laser) to generate a dual beam (i.e., two pump beams) sharing a same lens imaging system by refracting half of a cross section area of the collimated pump beam.

Figure 3A:
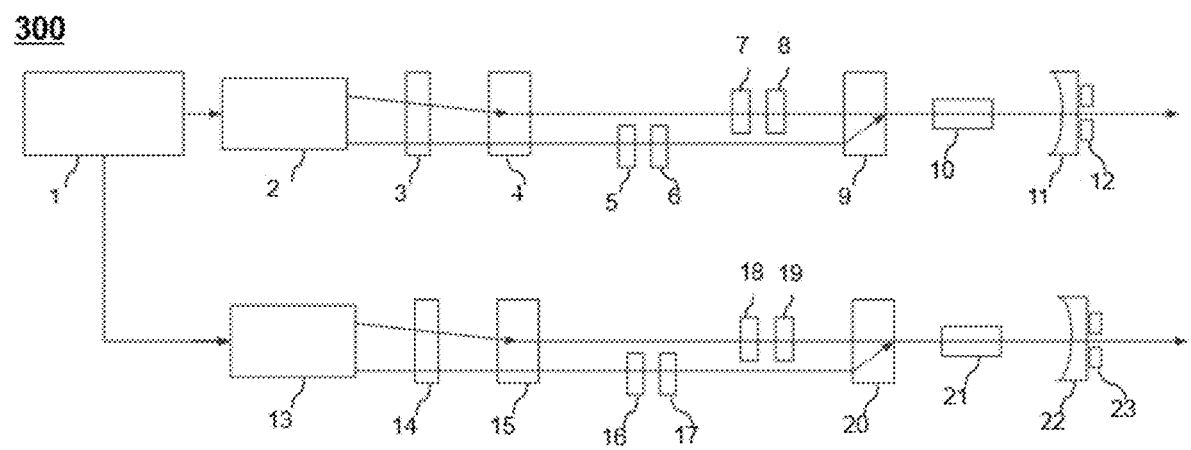
FIG. 3A and FIG. 3B are schematic diagrams illustrating an exemplary dual frequency laser for a dual mode optical lattice atomic clock according to some embodiments of the present disclosure.
Figure 3B:
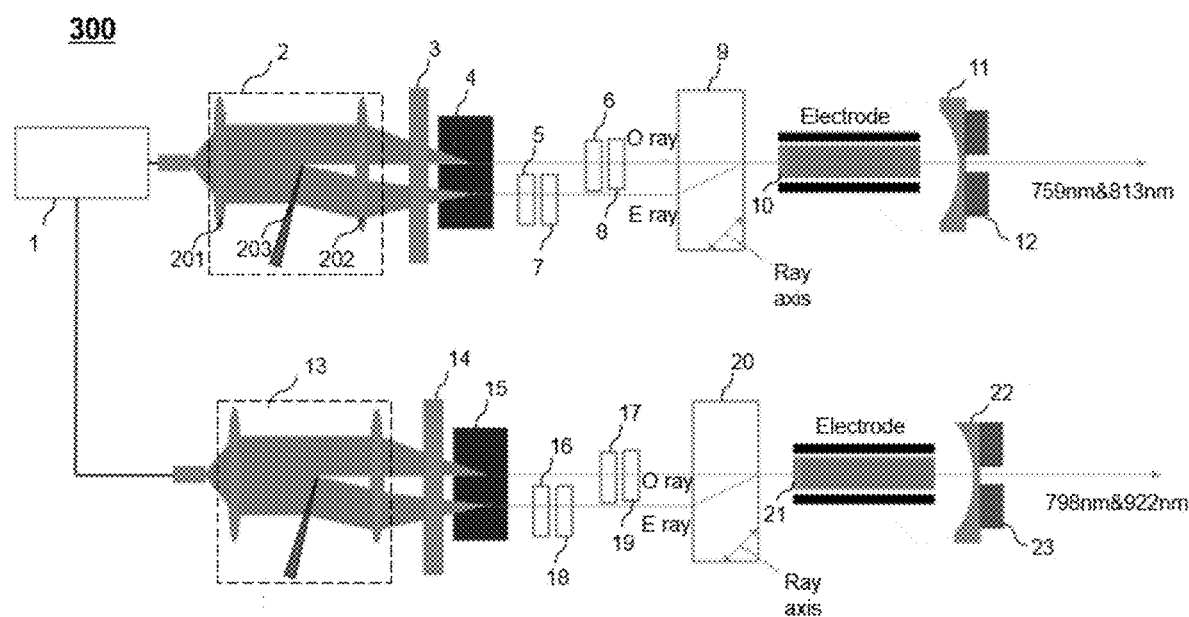

Referring further to FIG. 3B, the beam splitter set (2) includes a first focusing lens 201, a second focusing lens 202, and a wedge prism 203. The first focusing lens is used to collimate divergent beams output from the pump laser to obtain parallel beams with a good directionality; the second focusing lens is used to focus the collimated pump beam and guide the collimated pump beam into the pump laser path (i.e., the emission optical path of the pump laser). The wedge prism is provided between or at the rear end of the two focusing lenses for splitting the collimated pump beam into two spatially separated pump beams. The wedge prism has a wedge structure that generates two pump beams that are parallel to each other and slightly shifted paths by dividing the cross section area of the collimated pump beam in two portions.

In some embodiments, the 532 nm laser focuses a lens set through an optic transmission and the wedge prism is used to split the pump beam into two spatially separated lasers.

In some embodiments, the present disclosure employs a high power 532 nm dual beam laser for pumping. The dual beam is generated by the wedge prism refracting the collimated ray by half of its cross section area, such that the two beams are generated in the same laser and share the same lens imaging system. By regulating an insertion angle of the wedge prism, the two pump beams are matched to the vibration mode in the first resonant cavity to excite two orthogonally polarized intrinsic oscillation modes to achieve a dual mode laser output.

The vibration mode refers to all propagation modes in the first resonant cavity where the laser oscillation is likely to form. In some embodiments, the birefringent crystal is used to form propagation paths of orthogonally polarized O ray and E ray, within the first resonant cavity. The orthogonally polarized O ray and E ray correspond to two vibration modes that are independent from each other. The intrinsic oscillation mode refers to an eigen mode that actually forms a laser output under pump ray excitation. For example, the intrinsic oscillation mode corresponds to a vibration mode in an O ray direction, or a vibration mode in an E ray direction.

In some embodiments of the present disclosure, only one wedge prism and two focusing lenses need to be introduced to form two pump beams, which significantly reduces the complexity and a volume of the dual frequency laser, and at the same time, the two pump beams share the beam splitter set, which ensures that the two pump beams have matched optical features (e.g., a focal spot size, an optical range, and an incidence angle) when the two pump beams enter the first resonance cavity, thereby enhancing a stability of a system optical path.

In some embodiments, a set of birefringent filter and etalon is disposed in the propagation path of the O ray and the E ray, respectively, and a first birefringent filter and a first etalon are taken as a first set disposed in the propagation path of the O ray; and a second birefringent filter and a second etalon are taken as a second set disposed in the propagation path of the E ray. The anti-reflective coating of the birefringent filter and the high-reflective coating of the concave reflector have spectral bands with overlapping edges, the spectral bands are used for a rough selection of the laser wavelength, and the etalon and the birefringent filter are used for a fine mode selection. One set of the birefringent filters includes the first birefringent filter (5) and the second birefringent filter (7); and one set of the etalons includes the first etalon (6) and the second etalon (8). More contents may be found in the related descriptions below.

The birefringent filter refers to an optical filter assembly for selectively transmitting a specific wavelength and polarization direction. The birefringent filter is made of a crystalline material, which has a birefringence phenomenon and a ray filtering function. In terms of laser filtering performance, the birefringent filter allows laser with a specific wavelength to pass through as required, while other wavelengths are clamped or eliminated.

The anti-reflective coating refers to an optical thin film layer used to reduce reflection and increase transmittance. In some embodiments, the anti-reflective coating is coated on a surface of the birefringent filter.

The high-reflective coating refers to an optical film structure used to increase a reflectivity of particular wavelength. In some embodiments, the high-reflective coating is coated on a reflection end surface of the concave reflector.

The spectral band refers to a region of continuous light signals within a certain range in a spectrum. The spectral band may be expressed in nanometers (nm) and used to describe a transmission or reflection response interval of an optical element. In some embodiments, the anti-reflective coating of the birefringent filter and the high-reflective coating of the concave reflector have spectral bands with overlapping edges, indicating that in a target wavelength region, a spectral response range of the anti-reflective coating and a spectral response range of the high-reflective coating has an overlapping spectral band that enables the first resonant cavity to have a lower optical loss in the target wavelength region, thereby realizing a preliminary screening of the laser wavelength. The target wavelength region may be set in advance based on a priori knowledge. For example, the target wavelength region is a wavelength centered at 759 nm or 813 nm.

The etalon is a tool used for measurement and calibration, usually applied in industrial production and scientific research. A principle of the etalon is to ensure an accuracy and reliability of a measurement result based on precise dimensions and specifications. For example, the etalon is a Fabry-Perot (FP) etalon. A primary role of the FP etalon is to control the wavelength and the frequency of the laser. As the FP etalon has an interference phenomenon, the photons with only specific wavelengths and frequencies are made to form stable oscillations in the first resonant cavity, thus realizing the output of the laser.

In some embodiments, by coating the overlapping edges of the spectral bands on an optical interface in a cavity to perform the rough selection and filtration on a vibration mode in the cavity (in the first resonant cavity), and to use the set of birefringent filter and etalon to perform a fine selection on the mode, the first resonant cavity is made to output dual frequency laser with a specific wavelength. A spectral band edge of the anti-reflective coating of each of the two birefringent filters respectively overlaps with a spectral band edge of the high-reflective coating of the concave reflector, to respectively realize a single frequency operation of a specific wavelength in a polarization direction.

The optical interface refers to a physical surface of the optical element in the first resonant cavity. The optical interface has a direct impact on propagation features (e.g., a reflection, a transmission, a refraction, a phase delay, etc.) of light. For example, the optical interface includes a surface of the concave reflector and a surface of the birefringent filter.

How to realize the required dual frequency laser on specific wavelengths is one of the technical challenges due to a wide gain bandwidth of the titanium sapphire crystal. To this end, the present disclosure employs a manner of coating overlapping spectral band edges on the optical interface in the cavity to perform the rough selection and filtration on the vibration mode in the cavity (i.e., in the first resonant cavity) and to use the set of birefringent filter and etalon to perform the fine selection on the vibration mode.

The manner of coating overlapping spectral band edges to perform the rough selection and filtration on the vibration mode in the cavity (i.e., the first resonant cavity) refers to that the spectral band of the anti-reflective coating coated on the birefringent filter and the spectral band of the high-reflective coating coated on the concave reflector overlap with each other, thereby forming a "transmission window" and realizing the rough selection of wavelengths. The fine selection on the vibration mode using a set of birefringent filter and etalon refers to that within the roughly selected wavelength, the etalon further screens a single longitudinal mode (e.g., 759.3 nm or 813.4 nm) by interference and suppresses adjacent longitudinal modes, thus realizing the fine selection of wavelengths.

Figure 2:
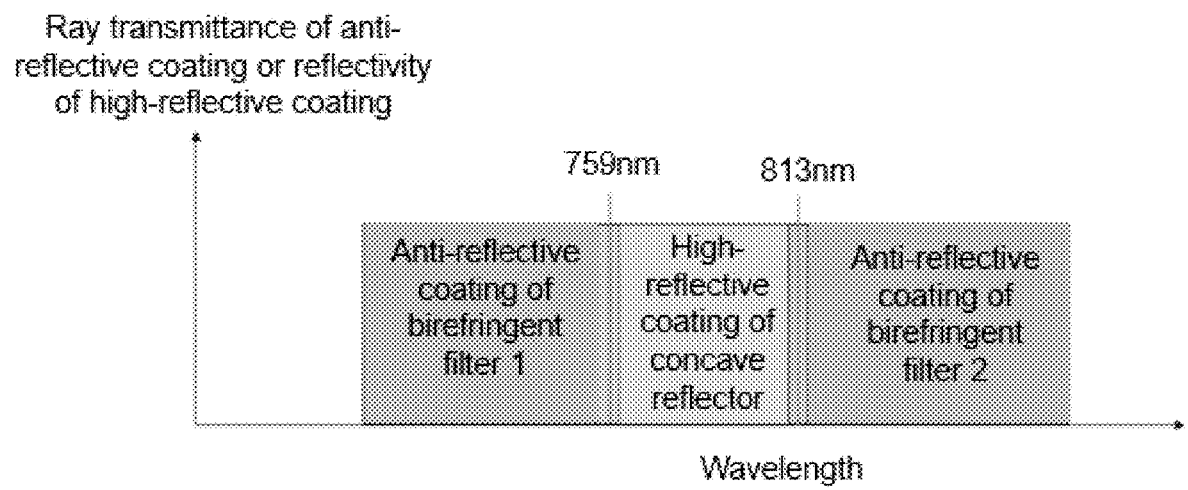
FIG. 2 is a schematic diagram illustrating a spectral matching relationship between an exemplary anti-reflective coating of a birefringent filter and a high-reflective coating of a concave reflector at wavelengths of 759 nm and 813 nm according to some embodiments of the present disclosure.

As shown in FIG. 2, the spectral band of the anti-reflective coating coated on a birefringent filter 1 and the spectral band of the high-reflective coating coated on the concave reflector overlap with each other, so that the loss within a narrow band centered at 759 nm is relatively small, thus achieving the selection of the vibration mode in the narrow band. At the same time, the birefringent filter 1 and the corresponding etalon are utilized for the fine selection on the mode to achieve a single frequency operation of the wavelength of 759 nm in the polarization direction. Similarly, the spectral band of the anti-reflective coating coated on a birefringent filter 2 and the spectral band of the high-reflective coating coated on the concave reflector overlap with each other, resulting in lower loss within a narrow band centered at 813 nm. In combination with the fine selection on the mode using the birefringent filter 2 and the corresponding etalon, the single frequency operation at 813 nm in the polarization direction is realized. The above manner makes it possible to realize a no mode hopping dual frequency output at 759 nm and 813 nm from the laser. The birefringent filter 1 may be the first birefringent filter, and the birefringent filter 2 may be the second birefringent filter. More contents about the first birefringent filter and the second birefringent filter may be found in the following related descriptions.

For example, as shown in FIG. 1, the first birefringent filter (5) and the second birefringent filter (7) are matched with the polarization directions of the O ray and the E ray in the first resonant cavity to roughly select the target wavelength centered at 759 nm and 813 nm while significantly suppressing other wavelengths. The first etalon (6) and the second etalon (8) in the first resonant cavity are disposed after the first birefringent filter (5) and the second birefringent filter (7), respectively. By fine regulating the incidence angle of the etalon or a length of an internal resonant cavity, specific single frequencies laser at 759 nm and 813 nm are further finely screened and locked, so that the first resonant cavity only allows the wavelengths corresponding to the single frequencies to stably resonant in the cavity. More contents about the first birefringent filter and the second birefringent filter may be found in the following descriptions.

The single frequency operation refers to that a dual frequency laser outputs at only one frequency (or wavelength) with no mode hopping or multimode interference. For example, a dual frequency laser only outputs a frequency with a center wavelength of 759 nm or 813 nm, and there is no coexistence of other wavelengths and no mode hopping phenomenon, thereby realizing a highly stable frequency output.

It should be noted that the titanium sapphire crystal, as a wideband gain medium, has a gain bandwidth covering a plurality of wavelengths, and is prone to an excitation of a laser resonance of the plurality of wavelengths within the resonant cavity, which leads to an unstable output frequency, i.e., an occurrence of the mode hopping phenomenon. Therefore, it is difficult for an existing dual frequency laser structure to realize the mode hopping free regulatable dual frequency output with the titanium sapphire as the gain crystal.

In some embodiments of the present disclosure, the dual frequency output with regulatable frequency and no mode hopping is achieved by utilizing independent birefringent filters and etalons combining the manner of coating the overlapping spectral band edges.

The electro-optic crystal (10) is an optical crystal material with an electro-optic effect. For example, the electro-optic crystal (10) is one of commonly used electro-optic crystal materials such as lithium niobate (LiNbO$_3$), potassium dihydrogen phosphate (KDP), barium β-borate (BBO), and potassium titanium oxide phosphate (KTP), etc. The electro-optic crystal (10) is disposed in the first resonant cavity.

In some embodiments, the electro-optic crystal (10) is used to add an electric field externally in a direction parallel to an electric vector of the O ray or the E ray to independently regulate a frequency of one polarized ray (one of the O ray and the E ray). For example, when a direction of the electric field added by the electro-optic crystal (10) is parallel to the direction of the electric vector of the ordinary or extraordinary ray, only the frequency of the polarized ray in the polarization direction is affected, and the polarized ray in the other directions is not significantly modulated. In this situation, the electric vector is also known as an E vector, and light waves are electromagnetic waves whose vibration direction of an electric field component (E vector) is defined as the polarization direction of ray.

The piezoelectric ceramic (12) is a ceramic material that undergoes mechanical deformations in response to an applied electric field, or generates electric charges in response to a force.

In some embodiments, the piezoelectric ceramic (12) is a lead zirconate titanate PZT, where P is an abbreviation for a lead element Pb, Z is an abbreviation for a zirconium element Zr, and T is an abbreviation for a titanium element Ti.

The PZT is a solid solution of PbZrOs and PbTiOs with a chalcogenide-type structure. The piezoelectric ceramic is polycrystals sintered by lead dioxide, lead zirconate, and lead titanate at 1200° C., with both positive and negative piezoelectric effects. A mirror of the cavity is fixed to the piezoelectric ceramic, and a micro conversion is generated when the piezoelectric ceramic expands and contracts, which regulates a change of a cavity length of the first resonance cavity, and thus stabilizes an output power or an output frequency of the first resonance cavity. The mirror of the cavity is a reflector assembly within the first resonant cavity. For example, the mirror of the cavity is a concave reflector.

In some embodiments, the piezoelectric ceramic (12) is used in concert with the electro-optic crystal (10) for regulating two laser frequencies (i.e., the laser frequencies of the O ray and the E ray), respectively to achieve a simultaneous locking of the dual frequency laser.

In some embodiments, the two birefringent filters are the first birefringent filter and the second birefringent filter. The first birefringent filter is coated with the anti-reflective coating with a wavelength coverage of 600 nm-770 nm, the second birefringent filter is coated with an anti-reflective coating with a wavelength coverage of 800 nm-1000 nm, the concave reflector is coated with a high-reflective coating with a wavelength coverage of 740 nm-830 nm. The laser frequency is finely regulated by a voltage between the piezoelectric ceramic (12) and the electro-optic crystal (10), so that the first resonant cavity outputs the dual frequencies at 759 nm and 813 nm.

In some embodiments, as the O ray and the E ray in the first resonant cavity are perpendicular to each other in the polarization direction, the electro-optic crystal (10) is inserted into the cavity and the electric field is applied in a direction parallel to the electric vector of the O ray or the E ray, thereby changing a refractive index of the electro-optic crystal (10), so as to make an optical range experienced by the O ray or the E ray that passes through the crystal to change, thereby realizing an independent regulation of the laser frequency of a corresponding direction without affecting the other polarized ray. In addition, the concave reflector is disposed in the first resonant cavity, and the concave reflector is supported by the piezoelectric ceramic (12). When a fine regulation of the frequency is required, a micro-voltage may be applied to the piezoelectric ceramic (12) to drive the concave reflector to generate a nanoscale back-and-forth displacement, which causes a small change in the cavity length of the first resonant cavity. The change of the cavity length results in a corresponding change in the resonant frequency, which regulates the laser frequency.

In some embodiments, through the birefringent filter, the etalon, and a coating structure with overlapping spectral edges disposed in the first resonant cavity, the laser in the target wavelength region is selected, and at the same time, a resonance of the laser with a non-target wavelength is suppressed, thereby limiting the first resonant cavity to only support the output of laser wavelengths of 759 nm and 813 nm.

In some embodiments of the present disclosure, the dual frequency output with regulatable frequency and no mode hopping may be realized by the birefringent filter and the etalon and combining the manner of coating overlapping spectral band edges.

On this basis, the frequency regulating and locking of the dual frequency laser is realized by using an intracavity electro-optic crystal (10) and the piezoelectric ceramic (12), which further enhance a stability and a controllability of the laser output frequency, thus satisfying the technical requirements by an atomic cooling as well as an optical lattice for a frequency certainty and stability. Meanwhile, based on a co-cavity structure, high power regulatable dual frequency lasers at 759 nm and 813 nm may be generated in the same cavity (i.e., the first resonant cavity), which significantly improves an integration of the dual frequency laser, and enhances a compactness and engineering adaptability of the dual frequency laser.

In some embodiments, the dual frequency laser further includes a second resonance cavity. The second resonance cavity contains the same optical elements as the first resonant cavity, and the second resonance cavity shares the 532 nm pump source with the second resonant cavity. A third birefringent filter in the second resonant cavity is coated with the anti-reflective coating with a wavelength coverage of 600 nm-810 nm, a fourth birefringent filter is coated with the anti-reflective coating with a wavelength coverage of 910 nm-1,000 nm, and the concave reflector is coated with the high-reflective coating with a wavelength coverage of 790 nm-930 nm; by regulating two birefringent filters and two etalons in the second resonant cavity for the mode fine selection, the second resonant cavity outputs the dual frequency laser at 798 nm and 922 nm.

The second resonant cavity refers to another independent cavity structure for forming the laser oscillations provided on the basis of a structure similar to the first resonant cavity.

In some embodiments, the second resonant cavity and the first resonant cavity are configured with separate optical elements with same function and structure, and each resonant cavity is a complete independent space. For example, as shown in FIGS. 3A and 3B, the second resonant cavity includes a beam splitter set (13), a dichroic mirror (14), a titanium sapphire crystal (15), a third birefringent filter (16), a third etalon (17), a fourth birefringent filter (18), a fourth etalon (19), a birefringent crystal (20), an electro-optic crystal (21), a concave reflector (22), and a piezoelectric ceramic (23).

In some embodiments, the second resonant cavity and the first resonant cavity share the same pump laser (1) to improve the compactness of the dual frequency laser structure and an energy utilization.

The third birefringence filter (16) and the fourth birefringence filter (18) are disposed in the second resonant cavity for selectively regulating the output wavelength of the laser in the second resonant cavity.

In some embodiments, the birefringent filter in the second resonant cavity is identical in structure and function to the birefringent filter in the first resonant cavity, but differs in coating parameters to achieve the dual frequency laser output with different wavelength combinations. Specifically, the third birefringent filter (16) in the second resonant cavity may be coated with an anti-reflective coating with a wavelength coverage of 600 nm-810 nm by a coating manner. A transmission band of the third birefringent filter (16) may cover a target wavelength of 798 nm, which is used for selecting the laser wavelength and realizing an effective output. The fourth birefringent filter (18) may be coated with an anti-reflective coating with a wavelength coverage of 910 nm-1000 nm. A transmission band of the fourth birefringent filter (18) may cover a target wavelength of 922 nm, which is used for selecting the wavelength and realizing the effective output.

In addition, the concave reflector (22) in the second resonant cavity is coated with the high-reflective coating with a wavelength coverage in a range of 790 nm-930 nm to cooperate with the birefringent filter to achieve the stable oscillation and output of the laser at the target wavelength.

In some embodiments, the third birefringent filter and the fourth birefringent filter are matched to the polarization directions of the O ray and the E ray within the cavity to obtain the spectrum within the target wavelength while significantly suppressing the non-target wavelengths. On this basis, the third etalon (17) and the fourth etalon (19) in the second resonant cavity are configured after the corresponding filters, respectively, to further finely screen and lock specific single frequencies laser at 798 nm and 922 nm by fine-regulating the incidence angle of the etalon or the cavity length of the internal resonance cavity, so that the second resonance cavity allows only a single frequency of the corresponding wavelength to be stably resonated in the cavity.

The concave reflector (22) of the second resonant cavity is coated with the high-reflective coating with the wavelength coverage of 790 nm-930 nm, and the reflection spectral band edge of the high-reflective coating overlaps with the spectral edges of the anti-reflective coatings of the third and fourth birefringent filters, so as to form a narrow and low-loss feedback window at the wavelengths near 798 nm and 922 nm to achieve a stable resonance at the required wavelengths, thereby improving the stability and efficiency of the selected laser outputs at 798 nm and 922 nm.

In some embodiments, the birefringent filter in the second resonant cavity cooperates with the etalon to accurately select and stably output the dual frequency laser t 798 nm and 922 nm. In addition, the frequency fine-regulating and the synchronous locking of the laser with wavelengths of 798 nm and 922 nm are further realized by the cooperation of electro-optic crystal (21) and piezoelectric ceramic (23) structure, which forms the stable and reliable dual frequency output. A manner of regulating the laser frequency is similar to that of the first resonant cavity, as may be seen in the above description, which is not repeated herein.

FIG. 3A and FIG. 3B are schematic diagrams illustrating an exemplary dual frequency laser for a dual mode optical lattice atomic clock according to some embodiments of the present disclosure.

As shown in FIGS. 3A and 3B, the dual frequency laser includes a 532 nm pump laser (1), the beam splitter set (2), the dichroic mirror (3), the titanium sapphire crystal (4), two birefringent filters (5) and (7) (equivalent to a first birefringent filter and a second birefringent filter), two etalons (6) and (8), a birefringent crystal (9), an electro-optic crystal (10), a concave surface reflector (11), an electro-optic crystal (10), and a piezoelectric ceramic (12). The dichroic mirror (3) and the concave reflector (11) form a first resonant cavity. The 532 nm pump laser (1), together with the beam splitter set (13), the dichroic mirror (14), the titanium sapphire crystal (15), the two birefringent filters (16) and (18) (equivalent to a third birefringent filter and a fourth birefringent filter), the two etalons (17) and (19), the birefringent crystal (20), the electro-optic crystal (21), the concave reflector (22) and the piezoelectric ceramic (23) forms the second resonant cavity, thus forming a "one-pump, two-cavity, four-wavelength" laser system, which significantly improves a compactness laser system.

In some embodiments of the present disclosure, by expanding and disposing the second resonant cavity based on the first resonant cavity, and making the two resonant cavities share the same pumping source, the "one-pump, two-cavity, four-wavelength" structure is formed. The structure significantly expands a type and a count of output wavelengths under a premise of ensuring the compactness of the dual frequency laser, so that the laser further generates the dual frequency laser at 798 nm and 922 nm on the basis of simultaneously outputting 759 nm and 813 nm. The dual frequency laser of 798 nm and 922 nm may be used for a first-stage cooling, a transverse cooling, and a Zeeman deceleration after frequency doubling in dual mode optical clock system.

The "one-pump, two-cavity, four-wavelength" refers to one 532 nm pump laser, two independent resonant cavity structures (the first resonant cavity and the second resonant cavity), and four output laser wavelengths (the first resonant cavity outputs layer rays of 759 nm and 813 nm, and the second resonant cavity outputs 798 nm and 922 nm).

In some embodiments, by regulating an insertion depth of the wedge prism in the pump laser path, a power ratio between two pump beams separated in each resonant cavity and a power ratio between the corresponding output dual frequency lasers are regulated.

The power ratio refers to a ratio of magnitudes of the powers of the two laser frequencies output from the first resonant cavity or the second resonant cavity, for example, the power ratio between the two pump beams of the first resonant cavity and the power ratio between the corresponding output dual frequency laser (e.g., 759 nm and 813 nm), or the power ratio between the two pump beams of the second resonant cavity and the power ratio between the corresponding output dual frequency laser (e.g., 798 nm and 922 nm)

In some embodiments, by changing a depth position of the wedge prism inserted into a cross section of the pump beam, respective power magnitudes of the two separated pump beams are precisely controlled. For example, when increasing the insertion depth of the wedge prism, a section area of a beam that is intercepted and deflected by the prism increases, and a power taken by the separated beam increases, and conversely, when the insertion depth decreases, the cross section area of the pump beam separated decreases and the corresponding power decreases.

In some embodiments of the present disclosure, by adjusting the insertion depth of the wedge prism, a flexible control of the proportion of power distribution of the two pump beams that enter each resonant cavity is achieved, thereby enabling the output power ratio of the dual frequency laser to be regulated, and significantly improving flexibility and configurability of the dual frequency laser in practical applications, and facilitating a personalized optimization of the output power ratio of the laser for different application scenarios.

In some embodiments of the present disclosure, key innovations of the dual frequency laser for dual mode optical lattice atomic clock include, but are not limited to: 1) Conventional optical lattice atomic clocks typically employ multiple independent single wavelength lasers for laser cooling of atoms and optical lattice trapping, which results in a complex, bulky, and costly structure. In some embodiments of the present disclosure, a complexity of the dual frequency laser is reduced by generating both O ray and E ray in the same cavity (i.e., in the first resonant cavity) and making both lasers share the same pump source. 2) As the titanium sapphire crystal has a very wide gain bandwidth, it is prone to mode hopping. As a result, it is difficult for existing dual frequency laser structures to achieve a mode hopping free regulatable dual frequency output with the titanium sapphire as a gain crystal. In some embodiments of the present disclosure, independent birefringent filters and etalons are utilized in conjunction with the manner of coating overlapping spectral band edges to achieve the frequency-regulatable and mode hopping-free dual frequency output. (3) In addition, a frequency locking of the dual frequency laser is achieved using the intracavity electro-optic crystal and the piezoelectric ceramic, thus satisfying the requirements of frequency certainty and stability for atomic cooling as well as for the optical lattice.

In some embodiments of the present disclosure, the proposed "one-pump, two-cavity, four-wavelength" structure significantly reduces the complexity and an overall cost of the dual frequency laser for a dual mode optical lattice atomic clock, which has good integration and practicability, and significantly improves the compactness of the dual frequency laser.

The basic concepts have been described above, and it is apparent to those skilled in the art that the foregoing detailed disclosure serves only as an example and does not constitute a limitation of the present disclosure. While not expressly stated herein, various modifications, improvements, and amendments may be made to the present disclosure by those skilled in the art. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments thereof. Such as "an embodiment," "one embodiment," and/or "some embodiments" means a feature, structure, or characteristic associated with at least one embodiment of the present disclosure. Accordingly, it should be emphasized and noted that the "an embodiment" or "one embodiment", or "some embodiments" referred to two or more times in different positions in the present disclosure means a feature, structure, or characteristic related to at least one embodiment of the present disclosure. In addition, certain features, structures, or characteristics in one or more embodiments of the present disclosure may be suitably combined.

Furthermore, unless expressly stated in the claims, the order of the processing elements and sequences described herein, the use of numerical letters, or the use of other names are not intended to qualify the order of the processes and methods of the present disclosure. While some embodiments of the invention that are currently considered useful are discussed in the foregoing disclosure by way of various examples, it should be appreciated that such details serve only illustrative purposes, and that additional claims are not limited to the disclosed embodiments. Rather, the claims are intended to cover all amendments and equivalent combinations that are consistent with the substance and scope of the embodiments of the present disclosure. For example, although the implementation of various components described above are embodied in a hardware device, it can also be implemented as a software only solution, e.g., an installation on an existing server or mobile device.

Similarly, it should be noted that in order to simplify the presentation of the disclosure of the present disclosure, and thereby aiding in the understanding of one or more embodiments thereof, the foregoing descriptions of embodiments of the present disclosure sometimes group multiple features together in a single embodiment, accompanying drawings, or a description thereof. However, this manner of disclosure does not imply that the objects of the present disclosure require more features than those mentioned in the claims. Rather, claimed subject matter may lie in less than all features of a single foregoing disclosed embodiment.

Numbers describing the count of components, attributes, and properties are used in some embodiments, and it is to be understood that such counts used in the description of embodiments are modified in some examples by the modifiers "approximately", "nearly", or "substantially". Unless otherwise noted, the terms "about," "approximate," or "approximately" indicates that a +20% variation in the stated count is allowed. Correspondingly, in some embodiments, the numerical parameters used in the specification and claims are approximations, which can change depending on the desired characteristics of individual embodiments. In some embodiments, the numerical parameters should consider a specified count of valid digits and employ a general place-keeping. While the numerical domains and parameters used to confirm the breadth of their ranges in some embodiments of the present disclosure are approximations, in specific embodiments such values are set to be as precise as possible within a feasible range.

For each patent, patent application, patent application disclosure, and other material cited in the present disclosure, such as articles, books, manuals, publications, documents, etc., the entire contents of which are hereby incorporated herein by reference. Application history documents that are inconsistent with or conflict with the contents of the present disclosure are excluded, as are documents (currently or hereafter appended to the present disclosure) that limit the widest scope of the claims of the present disclosure. It should be noted that to the extent that there is an inconsistency or conflict between the descriptions, definitions, and/or use of terms in the materials appurtenant to the present disclosure and those set forth herein, the descriptions, definitions and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A dual frequency laser for a dual mode optical lattice atomic clock, wherein the dual frequency laser comprises a 532 nm pump laser source, and in an emission optical path of the 532 nm laser, a beam splitter set, a dichroic mirror, a titanium sapphire crystal, a birefringent crystal, an electro-optic crystal, a concave reflector, and piezoelectric ceramics (PZT) are disposed sequentially, wherein the dichroic mirror and the concave reflector form a first resonant cavity configured to generate a laser;
the beam splitter set is configured to split a collimated pump beam into two pump beams that are spatially separated;
an optical axis of the birefringent crystal is at an angle of 45° to a light incidence plane to generate propagation paths for ordinary ray and extraordinary ray within the same cavity to form two eigen modes; in each of the propagation paths for ordinary ray and extraordinary ray, a set of birefringent filter and etalon is provided, an anti-reflective coating of the birefringent filter and a high-reflective coating of the concave reflector have spectral bands with overlapping edges, the spectral bands being used for a rough selection of a laser wavelength, and the etalon and the birefringent filter being used for a mode fine selection;
the electro-optic crystal is configured to add an electric field externally in a direction parallel to an electric vector of the ordinary ray or an electric vector of the extraordinary ray to independently regulate a frequency of one polarized ray; and
the piezoelectric ceramic is combined with the electro-optic crystal to regulate two laser frequencies simultaneously.

2. The dual frequency laser of claim 1, wherein the beam splitter set includes two focusing lenses and a wedge prism, the wedge prism being inserted into a pump laser path to generate the two pump beams sharing a same lens imaging system by refracting half of a cross section area of the collimated pump beam.

3. The dual frequency laser of claim 1, wherein by coating the overlapping edges of the spectral bands on an optical interface in a cavity to perform the rough selection and filtration on a vibration mode in the cavity, and to use the set of birefringent filter and etalon to perform the mode fine selection, the first resonant cavity outputs dual frequency lasers with a specific wavelength; wherein a spectral band edge of the anti-reflective coating of each of the two birefringent filters respectively overlaps with a spectral band edge of the high-reflective coating of the concave reflector, to respectively realizes a single frequency operation of a specific wavelength in a polarization direction.

4. The dual frequency laser of claim 3, wherein
the two birefringent filters are a first birefringent filter and a second birefringent filter;
the first birefringent filter is coated with the anti-reflective coating with wavelength coverage of 600 nm-770 nm, the second birefringent filter is coated with the anti-reflective coating with a wavelength coverage of 800 nm-1000 nm, and the concave reflector is coated with the high-reflective coating with a wavelength coverage of 740 nm-830 nm; and
the laser frequency is finely regulated by a voltage of the piezoelectric ceramic and the electro-optic crystal, so that the first resonant cavity outputs the dual frequency lasers at 759 nm and 813 nm.

5. The dual frequency laser of claim 4, further comprising a second resonance cavity, wherein the second resonance cavity includes the same optical elements as the first resonant cavity, and the second resonance cavity shares the 532 nm pump laser source with the second resonant cavity;

a third birefringent filter in the second resonant cavity is coated with the anti-reflective coating with a wavelength coverage of 600 nm-810 nm, a fourth birefringent filter is coated with the anti-reflective coating with a wavelength coverage of 910 nm-1,000 nm, and the concave reflector is coated with the high-reflective coating with a wavelength coverage of 790 nm-930 nm; by regulating two birefringent filters and two etalons in the second resonant cavity for the mode fine selection, the second resonant cavity outputs the dual frequency laser at 798 nm and 922 nm.

6. The dual frequency laser of claim 2, wherein by regulating an insertion depth of the wedge prism in the emission optical path, a power ratio between two pump beams separated in each resonant cavity and a power ratio between the corresponding output dual frequency lasers are regulated.

* * * * *